Feb. 17, 1970 L. BALAMUTH 3,495,427
APPARATUS FOR ALTERING THE CROSS-SECTIONAL SHAPE OF A
PLASTICALLY DEFORMABLE WORKPIECE USING
HIGH FREQUENCY VIBRATIONS
Filed April 5, 1965 4 Sheets-Sheet 4
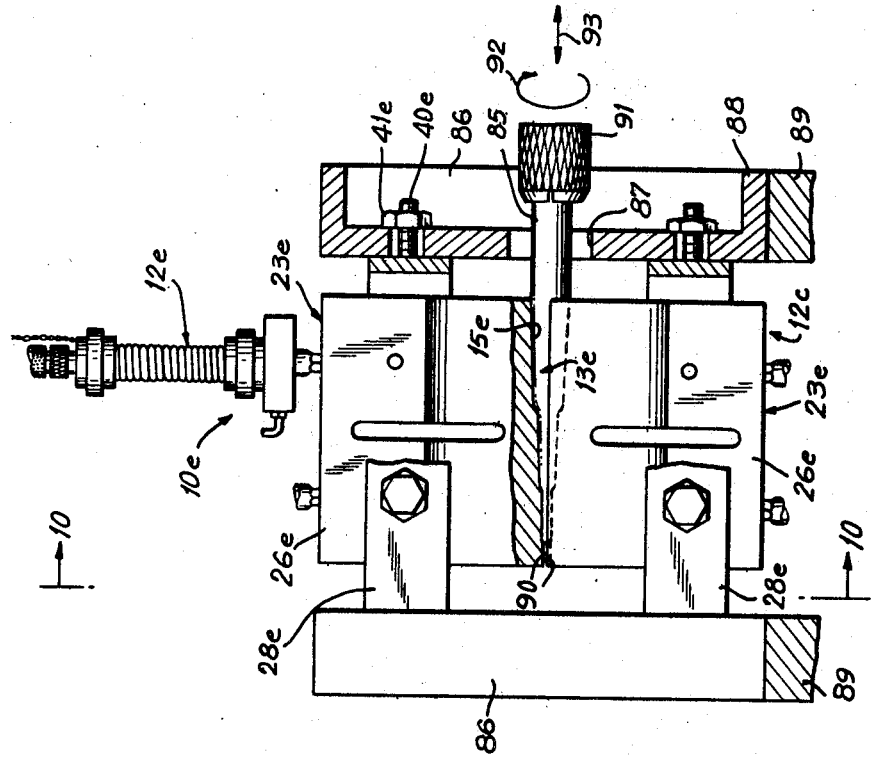
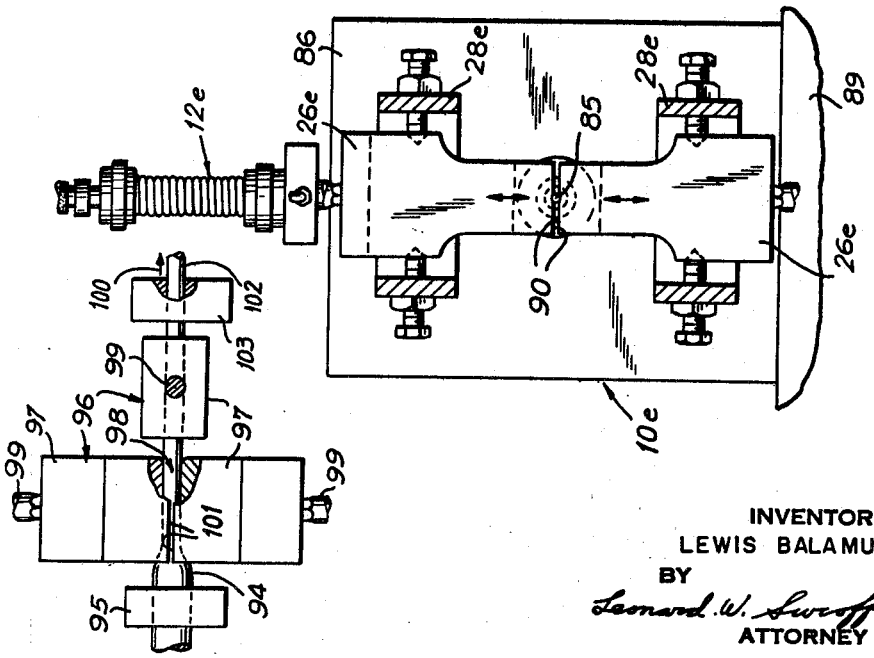
INVENTOR
LEWIS BALAMUTH
BY
Leonard W. Suroff
ATTORNEY United States Patent Office 3,495,427
Patented Feb. 17, 1970

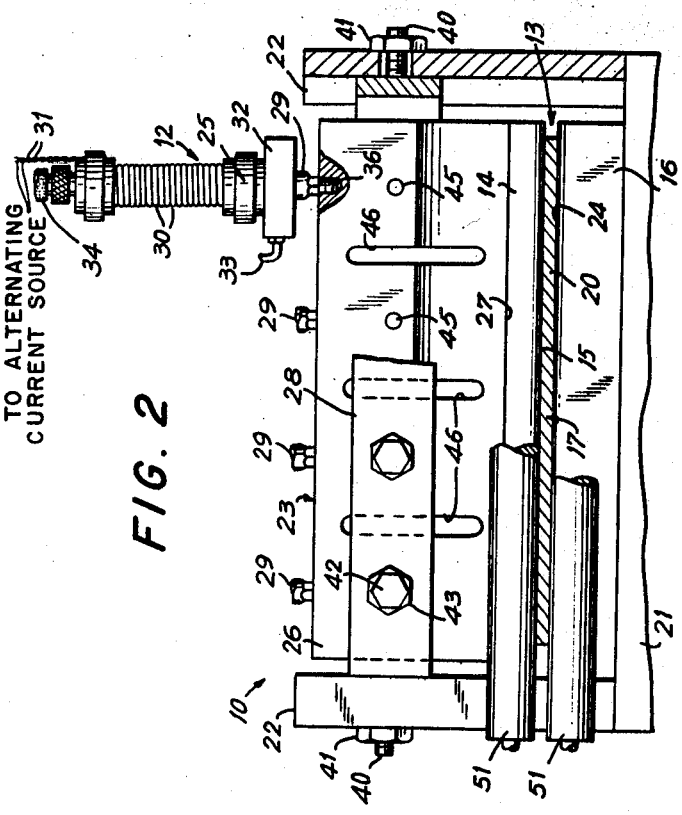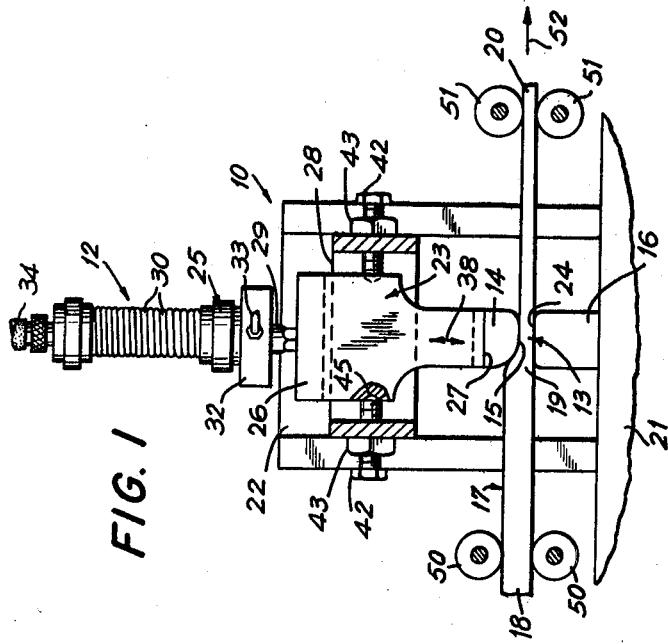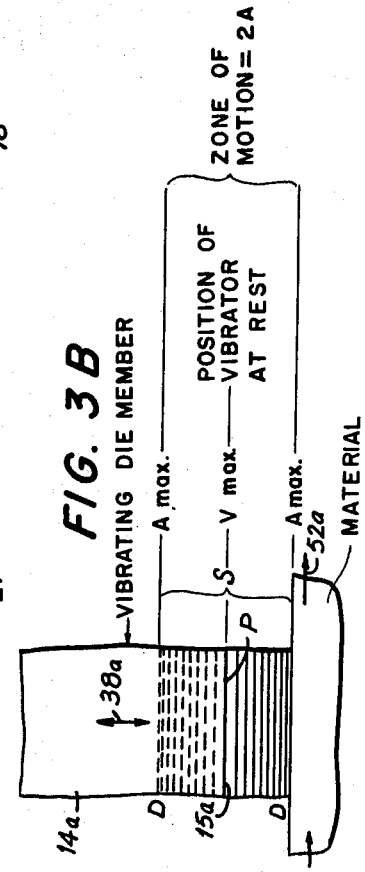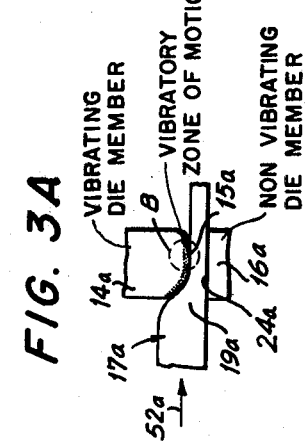
Feb. 17, 1970  L. BALAMUTH  3,495,427
APPARATUS FOR ALTERING THE CROSS-SECTIONAL SHAPE OF A
PLASTICALLY DEFORMABLE WORKPIECE USING
HIGH FREQUENCY VIBRATIONS
Filed April 5, 1965  4 Sheets-Sheet 1
INVENTOR
LEWIS BALAMUTH
BY
Leonard W. Suroff
ATTORNEY

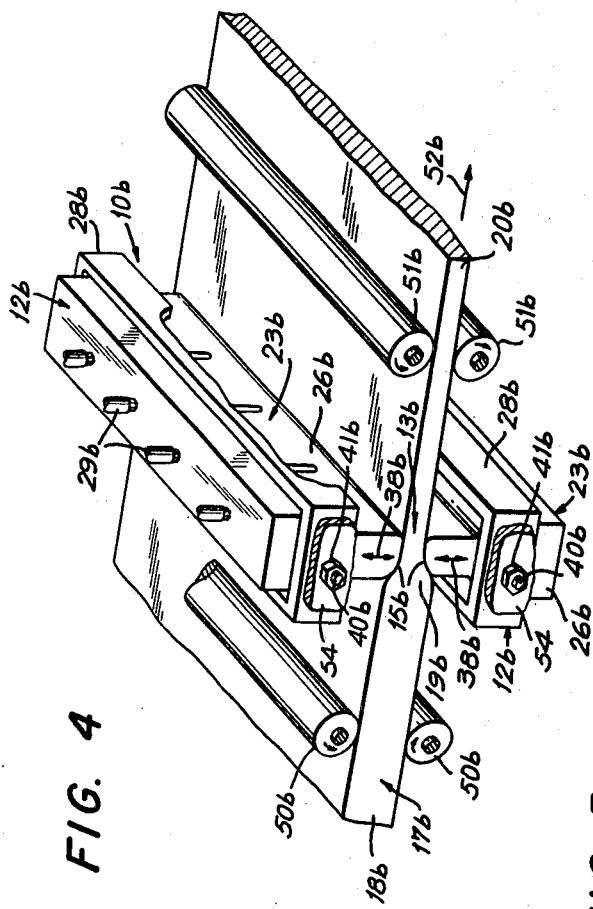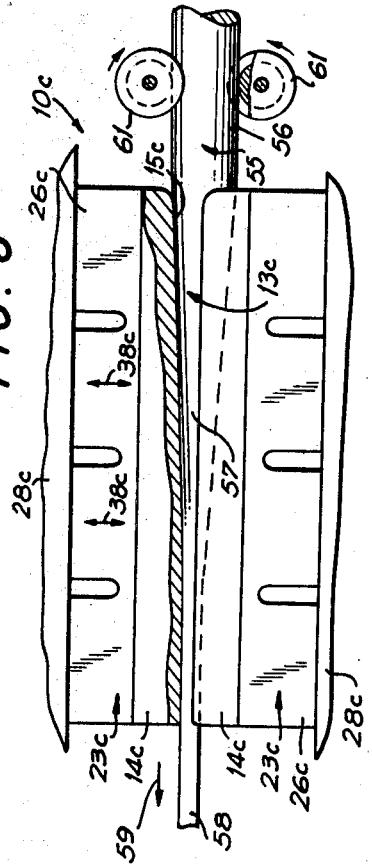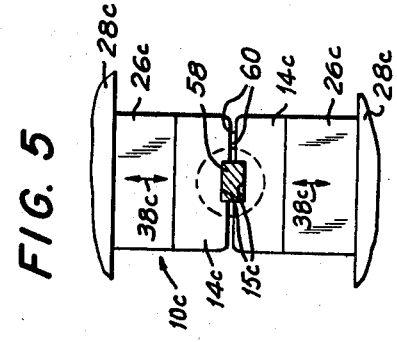
INVENTOR
LEWIS BALAMUTH

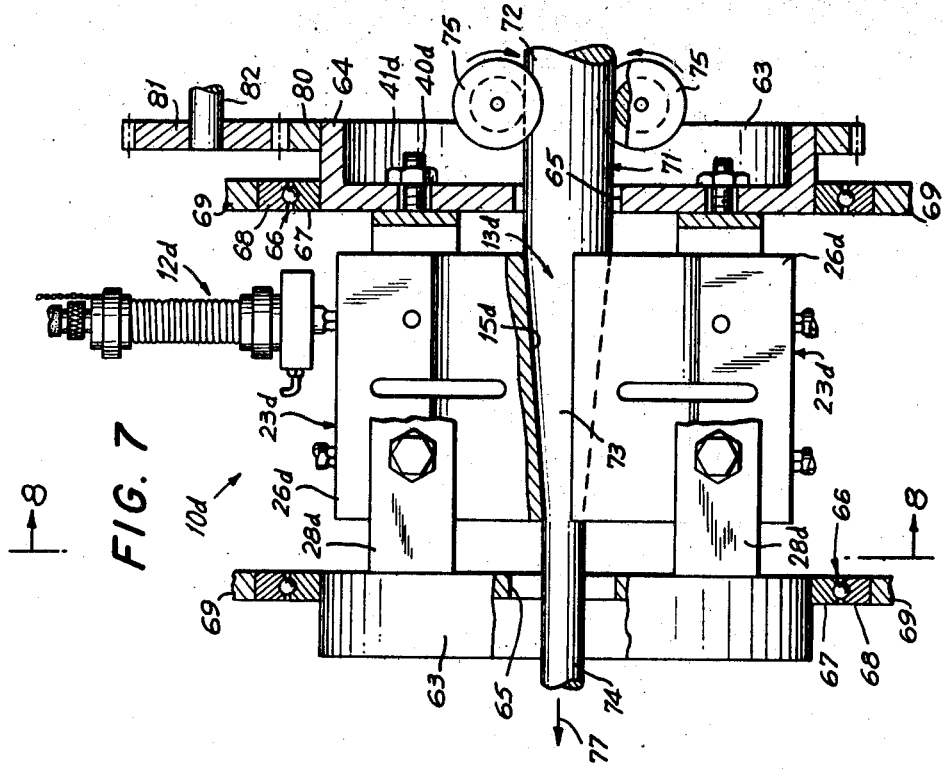
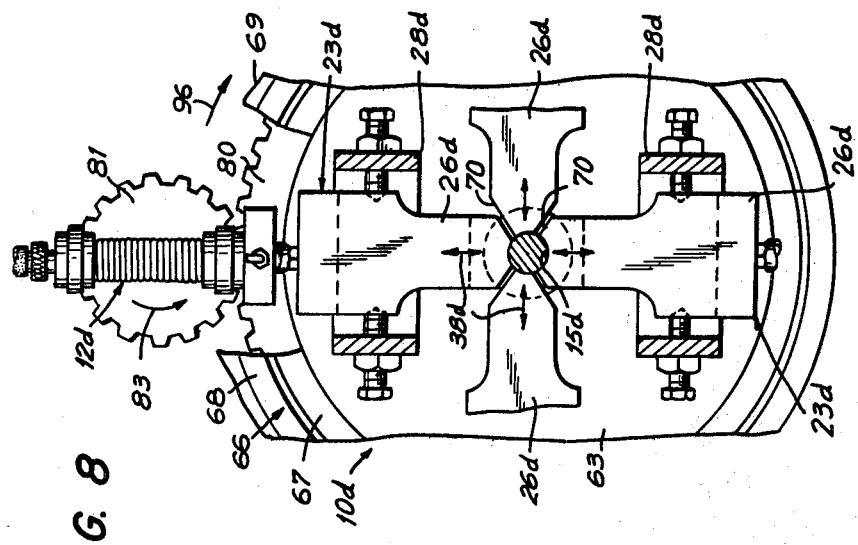

3,495,427
APPARATUS FOR ALTERING THE CROSS-
SECTIONAL SHAPE OF A PLASTICALLY
DEFORMABLE WORKPIECE USING HIGH
FREQUENCY VIBRATIONS
Lewis Balamuth, New York, N.Y., assignor to Cavitron
Corporation, Long Island City, N.Y., a corporation of
New York
Filed Apr. 5, 1965, Ser. No. 445,614
Int. Cl. B21d 26/00
U.S. Cl. 72—56                                    4 Claims

ABSTRACT OF THE DISCLOSURE

An apparatus for altering the cross section of a plastically deformable workpiece through the use of high frequency vibratory energy. The workpiece is continuously advanced through an opening formed by a multiple member die, at least one member of which is caused to vibrate in a plane substantially perpendicular to the direction of travel of the workpiece. The vibratory energy has a frequency and amplitude of vibration to substantially soften the workpiece and to reduce the frictional resistance between the workpiece and die members.

---

This invention relates to vibratory working of materials and, more particularly, it relates to an improved apparatus for altering the cross section of workpieces made of plastically deformable materials in which high frequency vibratory energy is imparted to the surfaces of the material being processed. The term "high frequency" throughout this specification is intended to mean the approximate range of 400 to 100,00 cycles per second.

Although the invention is particularly applicable to the vibratory working of metals, it will be realized that the means disclosed herein may be applied to the processing of a variety of plastically deformable materials.

Metal forming operations such as wire flattening, sheet rolling and the like are conventionally carried out in a rolling mill, which comprises essentially precision ball bearing supported rollers of hardened polished metal. These rollers receive the material through a guide system and press it with the new thickness and new shape by means of a static force transmitted by the rolls during the forming or rolling operation. If the rollers are rigidly suppoted in a pre-determined spaced relation, then the resistance of the rigid supports supplies the static force which forces the material between the rollers into its new shape.

Heretofore, elastic vibratory energy has been employed in metal working operations, the object of which is to reduce the cross-sectional area of the material being worked upon. In rolling operations the vibratory energy has generally taken the form of inducing the rollers to vibrate in a radial mode or in a plane parallel and transverse to the direction of movement of the metal passing between the rollers.

Vibratory energy has also been employed in the process generally known as wire or metal drawing in which the workpiece is passed through a restricted orifice in a die to reduce its cross-sectional area. Essentially this consists of vibrating the die as the metal is passed therethrough. The method selected is generally dependent on the size and the particular material involved.

The above described existing devices employing sonic or ultrasonic energy for changing the cross-sectional area of a metal have several disadvantages. In those existing devices utilizing rollers, that are induced to vibrate either longitudinally or radially, undesirable complexities arise in the construction of these rollers. If a roller is to vibrate longitudinally, namely, in a plane parallel to the movement of the material, the problem of maintaining a plane wave front of in phase vibrations cannot be conveniently realized over the entire outer surface of the roller. This is especially true for rolls whose dimensions are a significant fraction of a wavelength. One skilled in the art would readily appreciate that the known beneficial effects of friction reduction are maintained at a maximum if the entire surface of the material being processed is subjected to a uniform amplitude of high frequency vibrations. One can further appreciate that a longitudinally vibrated roller of substantial length will produce complex interactions of vibrations that will continuously vary over the length of the roller. This results in non-uniform vibratory motion being imparted to the surfaces of the material being worked upon.

In those applications employing rollers that are radially vibrated, the amplitude of vibration, which is of prime importance, is wholly dependent on the diameter of the roller and frequency of vibration as well as the endurance limit of the material from which the rollers are constructed. In many instances the amplitudes desired, at a given frequency, are either not easily obtainable or are impossible with rollers that are radially vibrated.

Further, the rollers only effect rolling contact with the sheets or webs to be processed, which is, at the point of tangency therebetween and for a period of time determined by the speed at which the sheets or webs are fed between the rollers. If elastic vibratory energy is to be introduced into the metal for a period of time sufficient to produce substantial metal working results, then the rate of displacement or feed of the sheets or webs is correspondingly limited and high speed metal rolling is precluded.

The existing wire drawing apparatus is also limited in the direction in which the vibratory motion is imparted to the workpiece, the amplitude of vibration, and more particularly the capacity of the metal being processed.

The present invention has for its primary object to provide improved material working apparatus wherein the aforementioned disadvantages of conventional techniques are avoided.

An additional object of the invention is to provide an apparatus for altering the cross-sectional area of plastically deformable materials without the use of pressure rollers.

Another object of this invention is to provide an improved apparatus for reducing the cross section of plastically deformable materials by imparting larger quantities of vibratory energy to the material being processed than heretofore feasible.

A further object of the present invention is to provide improved metal drawing apparatuses wherein the drawing force to pass the metal through the die members is substantially reduced.

Still another object of the present invention is to provide novel material working apparatuses wherein the static pressures against the metal being processed is substantially reduced.

Yet another object of the present invention is to provide novel apparatuses for reducing the cross section of a metal wherein a non-rotary vibratory member replaces the rollers applied in conventional metal rolling techniques.

A still further object of this invention is to provide novel apparatuses having particular application to the art of metal working but capable of more general use on a variety of other materials.

It is well known that rolling friction is substantially less than sliding friction. In the existing ultrasonic devices described for changing the cross-sectional area of the material which may be in strip, sheet or web form, the roller has still been retained as an essential element. The retention of rollers was essentially adopted under the mistaken notion that the substantial reduction of friction required could only be obtained by retaining the use of rollers, although some form of vibratory energy is imparted to said rollers. However, it has now been found that the vibrations need not be imparted to the metal with the use of rollers at all. In fact it has been found preferable to apply high frequency vibratory energy in a plane substantially perpendicular to the direction of movement of the metal. These high frequency vibrations, even over extended surfaces, act to substantially minimize the frictional resistance to movement of the engaged sheet or web in the direction of its movement without need for the employment of rollers.

The invention contemplated herein takes advantage of the uniquely high acceleration inherent in high frequency mechanical vibrators, whereby, even though two surfaces are pressed together under high force nevertheless the surfaces may actually separate on each cycle of vibration. This separation permits an enormous reduction in the sliding friction which a member being drawn between the two vibrating surfaces would otherwise experience. In consequence, I have discovered an apparatus whereby a piece of metal under metal forming levels of force may be altered in its dimensions on a continuous production basis without having to resort to the complexities of ball bearing supported rotary rolls.

Furthermore, the invention contemplates taking advantage of the discovery that, over a very wide range of frequency from 400 to 100,000 cycles per second, a metal, under vibratory energy input stimulation, will undergo a softening effect substantially similar to what it would experience at an elevated temperature. Therefore, when passing a metal between non-rotating vibratory elements in fixed relationship to each other, it will encounter just this softening action.

The combination of these effects means that a revolutionary new conception of a rolling mill is made practical for the first time. Simply, by drawing the metal wire, strip, sheet or web to be formed through a pair of die members at least one of which is vibrated, under static force, it will be found that very low drawing forces are required and considerable alterations in shape and reductions in size may be achieved.

In the apparatus disclosed herein, there is no orifice to be contended with and each separate section of the forming tool may be independently vibrated. Also, the amplitude of vibration may be made many times larger than that which is possible in drawing dies. Since it is the amplitude of vibration which determines the magnitude of the softening effect and the extent to which sliding friction is reduced, it can be seen why the new invention, herein disclosed, is so important in this field.

This invention is not limited to replacing rolling mill operations. It is also contemplated to provide a new type of swaging machine whereby the swaging dies, ordinarily made in separate parts are separately vibrated at large amplitude while the swaging operation proceeds.

By the utilization of non-rotary vibratory members, it is possible within a limited physical distance to subject the metal sheet or web to millions of high frequency vibratory blows in short time intervals. In rotary members we are essentially dealing with nominal line contact in that two rolling cylinders contact the metal being processed continuously on a moving tangent line only. The nominal line contact in roller processing applications is generally called the "nip," and takes into account the elastic deformability of the processing elements under the stresses of nominal use.

A blade vibrator can have a working surface with a variable nip from nominal line contact to several feet in length. This is impossible with prior art devices employing rotary members.

To retain metallurgical qualities of the material, it is in certain instances desirable to change the cross-sectional area over a given distance. By the utilization of blade vibrators which may be constructed in accordance with U.S. Patent No. 3,113,225 for "Ultrasonic Vibration Generator," issued Dec. 3, 1963 and assigned to the present assignee, which may have an output surface of substantial length, it is possible to control this essential element in the material working process.

For those materials that previously required several passes between rotary members to obtain a substantial change in cross-sectional thickness, it is now possible with the present invention to replace these rollers with one or more vibratory members having a given finite width or dimension of substantial length in the plane of movement of the material. By finite area or width is meant one having a dimension in the plane of travel of the material being processed greater than nominal line contact between a metal roller and the material being processed. Thus, a surface area having a determinable nip, substantially greater than is generated by using two metal rollers in which only nominal line contact is generated is obtainable with the present invention.

In order to be clear about what we mean when we speak of large amplitude, we mean an amplitude which produces a peak acceleration of at least a hundred times the acceleration of gravity. Furthermore, it should be appreciated that, once it is possible to pull sheet materials through a pair of vibratory blade-like elements, for example, numerous useful material working effects due to the ultrasonic frequency range of vibration become possible. For example, plastic and metal welding are possible. Thus, nylon fabric could be welded at every cross-over point in a continuous production operation by this method. Or, paper, ordinarily made opaque by virtue of the tumbled arrangement of the translucent cellulose fibers, may be rendered transparent by compressing of the tumbled fibers together. These examples are by way of showing that the material working method contemplated is not limited to metals solely.

Accordingly, it is an important aspect of the present invention that the wires or sheets whose cross-sectional thickness or shapes are to be reduced or altered are subjected to a static pressure by being passed through two or more stationary die members defining a die opening and at least one of which is vibrated in a plane perpendicular to the movement of the material passing therebetween to substantially reduce the frictional resistance of the material therethrough.

In one embodiment of the invention, the wire or sheets to be processed are fed between the stationary, vibrated die members, each of which is maintained in a fixed spaced relationship to each other and has a high frequency vibrating surface contacting the adjacent wire or sheet, with the anti-friction effect of the vibrations of the die members being relied upon to permit the movement of the wires or sheets under a reduced static force and simultaneous change of material cross section as it moves relative to the die members.

Since the die members need not be rotatable and need not have a surface with a circular cross section in rolling contact with the engaged sheet or web, as in the existing rolling mill equipment, the operative surface of the die members in the apparatus embodying the present invention may be of substantial length in the direction of the material being processed, thereby making possible with the utilization of one work station, of say, one pair of vibrators, a substantially increased amount of elastic vibratory energy to be introduced at the work site. In this manner, it is possible in one pass to substantially reduce or alter the cross-sectional area or shape of the metal sheets or webs.

In accordance with another aspect of the invention for drawing or swaging wires, one or more pairs of opposing die members, considered as a unit, are mounted in fixed spaced relation to each other and the wire inserted therebetween is subjected to high frequency vibrations in a plane substantially normal to the surface of the metal wire and the die members are caused to simultaneously rotate about an axis which is generally parallel to the movement of the wire to obtain a smooth surface on said wire whose cross-section characteristics are being changed.

For a better understanding of the present invention, reference should be had to the accompanying drawings, wherein like numerals of reference indicate similar parts throughout the several views and wherein:

FIG. 1 is a side elevational view, partly broken away and in section, of the apparatus for reducing the cross section of a plastically deformable workpiece embodying this invention;

FIG. 2 is a front view, partly broken away and shown in section for the sake of clarity of the apparatus shown in FIG. 1;

FIG. 3A is a schematic representation of the interrelationship of the various elements to help illustrate the present invention;

FIG. 3B is a greatly magnified view in schematic form of a portion of the elements illustrated in FIG. 3A, to aid in explaining the principles of the present invention;

FIG. 4 illustrates the use of the invention wherein a pair of vibratory assemblies are employed;

FIGS. 5 and 6 are fragmentary side and front elevational views respectively, the latter partly broken away and in section, illustrating the use of the present invention wherein two vibratory assemblies are employed to reduce the cross section of the workpiece over an extended length;

FIG. 7 is a side elevational view, partly broken away and in section, which illustrates the use of the invention wherein the vibratory assemblies are rotated relative to the movement of the workpiece;

FIG. 8 is a vertical sectional view taken along the line 8—8 of FIG. 7;

FIG. 9 is a view similar to that of FIG. 7, but showing a modification in the means for obtaining relative rotation between the workpiece and vibratory assemblies;

FIG. 10 is a vertical section view taken along the lines 10—10 of FIG. 9;

FIG. 11 is a schematic view illustrating a modification of the invention.

Referring to the drawings in detail, and initially to FIGS. 1 and 2 thereof, it will be seen that a material working or shaping apparatus for changing the cross-sectional area or shape of a workpiece of plastically deformable material embodying the present invention and generally identified by the reference numeral 10 includes at least one vibratory assembly 12 which may include a die member 14 secured thereto and wherein said vibratory assembly is supported in longitudinal alignment with and in fixed spaced relationship to a backup means or lower die member 16 having a working surface 24 as to define a die opening or fixed gap 13 for the passage of the workpiece 17 therebetween, while vibratory energy is applied to said workpiece through the die member 14.

The apparatus 10 illustrated in FIGS. 1 and 2 is seen to include a bed 21 on which is rigidly mounted the lower die or backup member 16 and a pair of spaced apart U-shaped upright structural members 22 between which the vibratory assembly 12 is mounted in fixed spaced relationship to said lower die to subject the workpiece 17 to a static force when the workpiece is passed therebetween.

The feeding means for conveying the workpiece 17 through said die opening 13 may consist of a cooperative pair of pinch rollers 50 (FIG. 1) positioned in front of the vibratory assembly 12 and a second pair 51 positioned after the material has exited from the area in which its cross-sectional thickness has been altered. The rollers 50 and 51 are rotated in any conventional manner (not shown) to maintain their surfaces in contact with the material 17 to assure its continuous movement through the die opening 13. The plastically deformable material 17 which may be in sheet, web, rod or any other form desirable, will usually have an initial cross section of greater dimension in the plane normal to its path of movement than at least a portion of the spacing of said die opening. Thus, the workpiece 17 in sheet form illustrated in FIGS. 1 and 2 has an initial thickness as shown at 18, and after the sheet has been compressed and moved through the die opening 13, the thickness of sheet 17 will be smaller as indicated at 20. The area of transition from the greater thickness 18 to the lesser thickness 20 occurs at 19 in the period when said material is between the opposing working surfaces 15 and 24 of the die members 14 and 16 respectively and in general physical engagement therewith.

The invention contemplates the use of at least one vibratory assembly 12 that includes a transducer 25 and a mechanical vibratory member 23 which may consist of a transmission member or an acoustical impedance transformer 26 and a die member 14 secured thereto that is caused to longitudinally vibrate at its working surface 15 when vibrations of compressive waves are established in the transducer 25 and transmitted from the latter to said working surface by way of the die member 14. The illustrated configuration of the mechanical vibrator 23 is effective to amplify or increase the amplitude of vibrations during transmission of the latter from transducer 25 to the die output surface 15. The die member 14 is secured to the output surface 27 of the transmission member 26 in a manner to assure a proper transmission of the vibratory energy as by brazing, bolting or some other means. For certain applications no die member will be required and this invention contemplates the use of mechanical vibrators in which the output surface of the acoustical impedance transformer 26 will be utilized as the die working surface or as the die member. Additionally, for certain applications the vibratory member 23 may be driven by a single transducer 25.

The transducer 25 may be any one of a number of electromechanical types, such as, electro-dynamic, piezoelectric or magnetostrictive, however, for the operating range of frequencies most desirable for ultrasonic material working, transducer 25 is preferably of the magnetostrictive type. The magnetostrictive transducer 12 is preferably formed of a metal, such as Permanickel, nickel, Permendur, or other metals which have high tensile strength, and are highly magnetostrictive in character, so that the transducer will vibrate to a maximum degree when subjected to the influence of a biased alternating electromagnetic field established by biased alternating current supplied to a surrounding driving coil or winding from a suitable oscillation generator.

The vibratory assembly indicated generally at 12 in FIGS. 1 and 2 is mounted in a substantially vertical position within the rectangular frame 28 and is comprised of one or more of the following three basic portions, a transducer 25, a connecting body 29 and a vibratory member 23.

The transducer portion 25 and connecting body 29 preferably are of the type disclosed in U.S. Patent No. 3,123,951, granted Mar. 10, 1964, assigned to the present assignee and reference may be had thereto for a complete detailed description of the apparatus. As shown in the patent, the transducer consists essentially of a stack of elongated plates of magnetostrictive material surrounded by a coil excited from a source of alternating current. In accordance with the well known magnetostrictive effect, application of an alternating magnetic field to the plates will result in an elongation and contraction at the frequency of the alternating current provided a steady biassing magnetic flux is simultaneously evenly maintained in the said elongated plates of magnetostrictive material. In FIGS. 1 and 2 which merely show the external appearance of uch transducer, the coil winding is indicated by the numeral 30 and alternating current at suitable frequency is applied thereto via conductors 31 (FIG. 2). The magnetostrictive stack is disposed vertically within the coil 0. To render the vibratory output of the magnetaostrictive stack available for use, a connecting body 29, preferably solid and of a metal such as Monel, is rigidly fastened at one end to the stack.

Maximum transference of vibratory energy is obtained by making the connecting body of a length equal to an integral number of half wavelengths in the material at he applied frequency. The connecting body is rigidly mounted in a block 32 at a point corresponding to a node of vibration therein. A coolant may be supplied to maintain the temperature of the transducer assembly within reasonable limits through conduit 33 and circulated back out through the tube 34. The vibratory member is fastened to the lower end of the connecting body 29 via threaded connection 36 (FIG. 2).

As noted hereinabove, a complete discussion of the transducer and connecting body structure will be found in the aforementioned patent.

The vibratory member 23 may be comprised of an acoustic impedance transformer 26 which may be made of a strong, acoustically sound metal, such as, steel, Monel metal, titanium, Phosphor-bronze, brass or beryllium copper, and further includes an extension 14 either integral with, or rigidly joined to said transformer which forms the vibratory die element 14 of the apparatus 10. The vibratory member 23 consisting of the acoustic impedance transformer 26 and the element 14 are longitudinally dimensioned so that a loop of longitudinal motion occurs at the free end portion 15 of die element 14 when vibrations of compressive waves are established in the transducer 12 and transmitted from the latter to the die element by way of transformer 26. Further, the illustrated configuration of transformer 26 is effective to amplify or increase the amplitude of the vibrations during transmission of the latter from transducer 12 to die element 14.

The design and mounting of the vibratory member 23 will vary in accordance with the dimensions of the material to be processed, the properties thereof, i.e., metal, plastic, wood or paper.

In FIGS. 1 and 2, apparatus according to the present invention is illustrated in an application requiring a relatively long tool, having a substantial length transverse to the direction of movement of the material 17. In contrast to this, there will be cases where the material 17 to be worked upon is relatively narrow, and a single vibratory member driven by a single transducer may be adequate. However, once the width of the tool exceeds certain limits, which are determined by the power supply for the transducer and the material of the tool, the tool is incapable of providing uniform vibratory motion along its lower edge. Specifically, the amplitude of vibration becomes greatest at a point immediately beneath the connection of the transducer to the tool and falls off with distance from that point. In FIGS. 1 and 2 the vibratory member 23 is illustrated capable of utilization with sheets or webs of extended width.

The vibratory assembly 12 is non-rotatably mounted within a rectangular frame 28 at the ends of which are fixed a pair of threaded trunnions or studs 40 (FIG. 2). A pair of cooperating holes are provided in the U-shaped structural members 22 to receive the studs, and nuts 41 are provided at the outer extremity of the latter to fasten the framework between the sturctural members 22. The ends of the frame 28 may rest between the inner surfaces of the U-shaped members 22 to prevent rotation of the vibratory assembly 12 during the material working process. The entire assembly carried by the U-shaped members 22 may be mounted for vertical adjustment with respect to the lower die member or back-up 16 by any suitable means (not shown).

To support the vibratory member 23, the frame 28 is provided with a plurality of threaded studs 42 spaced along both longitudinal sides thereof. The studs 42 are threadedly engaged in the sides of the frame 28 and provided with locking nuts 43 in well known fashion. The vibratory member is excited into vibratory motion by a plurality of individual transducers 25, all of which may be driven in synchronism from the same source of alternating current.

To properly support the vibratory member 23, the acoustical impedance transformer is provided with indents 45 (FIG. 1) on either side thereof and located at or adjacent the nodal vibration point thereof. The indents 45 are placed to receive the pointed ends of the studs 42 and, as will be appreciated, the vibratory transmission member will be supported thereby when the studs are tightened and locked into place by means of the associated locking nuts. The above-mentioned mounting arrangement thus carries the entire vibratory assembly and rigidly supports it with respect to the bed 16 of the apparatus 10.

The tool illustrated in FIGS. 1 and 2 is shown to consist of four driven portions, each having its own transducer and separated from each other by slots 46 which substantially, but not completely, divide the tool into separate segments. These slots effectively isolate each section of the tool from one another to minimize interaction therebetween and thus permit more uniform vibration of the contact edges of the tool. This tool structure is described in greater detail in U.S. Patent No. 3,113,225 for "Ultrasonic Vibrated Members," and assigned to the present assignee. A tool of this type, used in material working apparatus, such as illustrated in FIGS. 1 and 2, permits application of the techniques of the present invention to surfaces having any desired width transverse to or in the plane of movement of the metal being processed.

With continued reference to FIGS. 1 and 2, the operation of reducing the cross section of the plastically deformable workpiece is performed in accordance with the present invention as follows.

The workpiece 17 is caused to pass between the die members 14 and 16 which have confronting working surfaces 15 and 24 respectively, which are non-rotatably mounted with respect to each other in spaced relationship to define a die opening 13 with a spacing wherein at least a portion of said spacing between its entrance and exit end is smaller than the largest dimension of the initial cross section of said workpiece entering said die opening to thereby decrease the cross section of said workpiece entering said die opening to thereby decrease the cross section of said workpiece as it passes therebetween.

When the workpiece 17 is passed between the die members 14 and 16, it is subjected to a static force generally in a plane substantially normal to the passage of the material therethrough. By maintaining the die members 14 and 16 in relatively fixed position with respect to each other, the movement of the workpiece 17 between the die members, which is in the direction of arrow 52, results in the application of static force in a direction substantially perpendicular to the direction of movement of said workpiece. Simultaneously with the movement of the workpiece 17 through the die opening 13, high frequency compressive waves are transmitted to said workpiece in its region of contact with the vibratory working surface 15.

The die member 14 is caused to vibrate by the high frequency compressive waves generated by the transducer 25 and transmitted to said die member by means of the transformer or transmission member 26, in a plane having a component of motion substantially perpendicular to the path of travel of the workpiece 17 passing in contact therewith and as generally indicated by the double-headed arrow 38. It is important that this vibratory energy be of sufficient amplitude of vibration which is approximately in the range of .125 inch to .0001 inch, and within the range of approximately 400 to 100,000 cycles per second, to substantially soften the workpiece as it passes between and in contact with the die surfaces 15 and 24. In addition to softening the material 17 in the region 19, it additionally reduces the frictional resistance to the passage of the workpiece through the die opening 13.

The underlying phenomena occurring during the material working process might be best explained with reference to FIG. 3A in which a vibrating die member 14a is shown in spaced relationship to a non-vibrating die member 16a as the workpiece 17a proceeds therethrough in the direction as indicated by the arrow 52a.

The vibrating working surface 15a creates what has been generally referred to by the inventor as a "vibratory zone of motion" which occurs over the entire working surface of the die member 14a. By the use of the mechanical vibratory member of the design generally indicated, as in FIGS. 1 and 2, it is possible to obtain in-phase vibrations along a working surface 15a of substantial lengths either in the direction of motion of the workpiece or in a plane transverse thereto or both. This variable nip or length in the plane of motion will permit the cross section to be reduced over a predetermined length and this will essentially depend on the material of the workpiece and the contour of the opposing working surfaces. This zone of motion is a key aspect in the understanding of why the new and novel results are obtainable when the apparatuses herein disclosed are employed. This zone of motion aids the material working process in its ability to reduce the frictional resistance of the workpiece 17a to the surfaces of the die members 15a and 24a which are maintained under a static pressure therewith.

FIG. 3B is an enlarged view of the encircled section B of FIG. 3A and is in schematic form to illustrate how the combined actions of friction reduction and vibratory energy are combined in one process.

First, the friction reduction effect might be explained by referring to FIG. 3A wherein 15a is the working surface of the vibrating die member 14a when said vibrator is at rest, i.e., when the transducer is not energized. When the die member 14a is vibrated in the plane normal to the surface of the workpiece 17a which is moving in the direction as indicated by arrow 52a, it will have a direction or component of vibratory motion normal to the plane of said moving workpiece. In accordance with the present invention, it has been found that a frequency range from about 400 to 100,000 cycles per second and an amplitude of vibration from .125 inch to .0001 inch permits the known beneficial effects of friction reduction to play a role in the material working process. The quantitative amount or interrelation of said friction reduction and the softening effect is not exactly determinable at the present time.

The vibrating die 14a will vibrate with a stroke S in the direction of motion of the double-headed arrow 38a. This stroke creates the zone of motion as indicated by the shading produced by the spaced parallel solid and dash lines in FIG. 3B. The lines eminating on either side of the working surface 15a which is also the plane of maximum velocity, $V_{max}$, in a given cycle of vibration, are initially spaced farthest apart, and as they approach the maximum excursion that the die member traverses in one cycle, they diminish in spacing to indicate that the vibratory velocity has diminished. Thus, the shading is the closest at points D where the acceleration is highest, $A_{max}$, and where the velocity is the lowest. Actually, a point, P, on the die working surface 15a obeys a simple equation as follows:

I.

Displacement of $P = X = A \sin 2\pi ft$
Speed of $P = V = 2\pi f A \cos 2\pi ft$
Acceleration of $P = a = -4\pi^2 f^2 A \sin 2\pi ft = -4\pi^2 f^2 x$ $f$ = frequency of vibration
$S$ = stroke of vibration
$A = S/2$ = amplitude of vibration Thus we have

II.

peak displacement = $A = \frac{1}{2}S$
peak speed = $2\pi f A = \pi f S = V_{max}$
peak acceleration = $4\pi^2 f^2 A = 2\pi f V_{max}$ We can compute a table of peak values for Equations I and II and we get the following approximate peak accelerations:

| | Frequency (kilocycles per second) | | | | |
| --- | --- | --- | --- | --- | --- |
| | 20 kc. | 10 kc. | 5 kc. | 1 kc. | .4 kc. |
| Peak displacement A (in.) | .002 | .002 | .002 | .002 | .002 |
| Peak speed $V_{max}$ (feet per second) | 20 | 10 | 5 | 1 | .4 |
| Peak acceleration $A_{max}$ (No. of g's) | 75,000 | 18,750 | 4,690 | 1,170 | 290 |

Thus is seen that we have a high reciprocal rate process of relatively low peak speed, but with very large peak accelerations.

In order for the separation of the die and workpiece to occur during vibration, we must know the acceleration which the static force tends to produce in the urging together of the two members if the movable member or die has a weight, W, then the static force, $F_0$, will produce in the weight, W, an acceleration given by $$A = \left(\frac{F_0}{w}\right)g$$

For example, if we have a 100 lb. die and there is a static force of 10 tons = 20,000 lbs., then $$A = \frac{20,000}{100}g = 200g$$

and the acceleration shown above are sufficiently high to guarantee separation of the die member and workpiece during compression. However, even in cases where complete separation does not occur, there is still a substantial beneficial force and friction reduction effect arising from the presence of the vibrations.

This same analysis is applicable to the embodiments herein illustrated wherein two or more vibratory assemblies are utilized and each have a vibrating surface for contact with the workpiece.

In addition to obtaining the above friction reduction effect and reduced static forces, it is possible to obtain a general work softening effect when the workpiece is brought into contact with the vibratory die member. Thus, as previously explained in addition to the static force, vibratory forces are applied in the direction substantially perpendicular to the surface of the workpiece 17a in the form of small amplitude, high frequency vibrations. The latter, which occur in the sonic or ultrasonic frequency range at approximately 400 to 100,000 cycles per second, cause the working surface 15a of the die member 14a to impact the surface of the workpiece 17a. As indicated in the above chart, high accelerations of at least 100 g occur at the die surface during vibration, thereby developing extremely high stress forces which causes the plastically deformable material, from which the workpiece is made of, to exceed its elastic limit, resulting in a flow of the workpiece 17a immediately adjacent to the surface of the die member as in the region 19a of FIG. 3A.

Thus, in accordance with this invention, the vibrations and the exerted static pressure are combined in such a new and novel way that relatively great alternating forces will be generated in the contact area, with correspondingly great stresses, which lead to alternating stresses in the plastically deformable material and a softening thereof.

From the above discussion of the invention, it is obvious that the combination of vibratory energy and static pressure results in the plastically deformable material being in intermittent contact with the die member. The intermittent contact causes an appreciable increase of the force of pressure which now must be considered as an impact-force. But these impact forces are very gentle when compared with the impact produced at lower frequencies, i.e., 60 c.p.s. The reason for this lies in the fact that the harmonic character of the high frequency vibration of the die member which is transmitted to the workpiece causes an intermittent contact of the latter owing to the high accelerations transmitted to it. The tool hits the workpiece at the "end of the stroke" and the vibration is transmitted to the workpiece. Not so at low frequencies where strong deviations from the sinusoidal form are the rule, causing "shock and chatter."

For example, if the die member were to be vibrated perpendicular to the surface of the plastically deformable material at a low reciprocating rate, the force that would arise by the impact of the die member and workpiece would be directly related to the kinetic energy within the vibratory system, and it would not be possible to obtain the desired "flow" of the plastic material by effectively causing it to exceed its elastic limit.

As soon as the frequency is raised so that the acceleration becomes absolutely a large quantity, say 100 g or more, the whole picture changes. However, the impact on the work surface takes place close to the end of the stroke where the speed is practically zero. We have a unique, novel process of putting many hundreds of cycles of stress per second into the plastically deformable material due to the low velocity impact. In addition, it is precisely during this impacting time that the acceleration of the tool is at its peak. Hence, the dynamic force of the impact is determined by the high acceleration. Without such high acceleration, the force of the impacts would be too far below the endurance level of the mate rial, and hence, the strain energy flow of the material could not occur.

In the additional embodiments of the invention, as seen in FIGS. 4 through 11, there are illustrated at least two vibratory assemblies and means are provided for vibrating both of said assemblies during the material working process as compared to the above described embodiment of the invention wherein only one assembly was employed.

Thus, in another embodiment of this invention 10b illustrated in FIG. 4, the principles of friction reduction and vibratory working are utilized in a material reduction process in which a pair of vibratory members 23b are simultaneously vibrated either in phase with each other, either at the same frequency or at different frequencies effective to produce beats, and at the same amplitude or at different amplitudes, while such die members are supported in opposed spaced relationship to each other.

In the previously described embodiments of the invention, the vibrated die member was a separate element joined to the output surface of the acoustical impedance transformer. It has been found for certain material processing applications that a separable die member of a material other than that of the transformer is not required and as such, the output surfaces of the acoustical transformers or transmission member are capable of acting as the working surfaces 15b thereof.

Thus, it will be seen that, in the devise 10b, two vibratory assemblies 12b, each including a vibratory member 23b having a relatively long working surface 15b, in the plane transverse to the movement of the workpiece 17b and said assemblies are non-rotatably mounted for supporting said vibratory assemblies 12b as a unit in alignment with and in spaced relationship to each other to define a die opening 13b therebetween. Each vibration transmission member 26b may be mounted within a rectangular frame 28b, by means previously discussed with respect to FIGS. 1 and 2, and said frames are supported as a unit by being secured to side plates 54 by means of studs 40b which extend through cooperating holes provided in the side plates 54 to receive the studs, and nuts 41b are provided at the outer extremity of the latter to fasten the framework to the side plates 54.

The vibratory energy is imparted to the vibratory member 23b by one or more transducers (not shown) that are coupled to the vibration transmitting member by means of connecting bodies 29b. It should be pointed out that the vibration transmitting member need not be designed to act as an acoustical impedance transformer.

The feeding means for conveying the workpiece 17b having an initial thickness 18b between and in contact with the opposing vibrating working surfaces 15b, to thereby transmit a static force to said workpiece as its cross-sectional area is being reduced in the region 19b, may consist of a pair of pinch rollers 50b and 51b, mounted before and after the vibrator assemblies 12b respectively and rotated in any conventional manner (not shown).

As the workpiece 17b is caused to pass between the vibratory members 23b in the direction as indicated by arrow 52b, it is continuously subjected on both its upper and lower surfaces to the elastic vibratory energy which has a substantial component of motion in a plane normal to the movement of said workpiece as illustrated by the double-headed arrow 38b. The opening 15b has an initial spacing at its entrance end less than the initial cross section 18b of the workpiece 17b immediately before its entrance into said opening to initially reduce the cross section thereof and said working surfaces 15b are further constricted to continue the change of cross section until the workpiece 17b exits from said opening.

By the use of blade-like vibratory devices, it is possible to impart the vibratory energy over areas of determinable dimensions greater than nominal line contact. Thus, a working surface having a determinable nip, is obtainable with the present invention. The working surface 15b, in FIG. 4 may range, for 20 kilocycles for example, from ¼ to 3 inches in the plane of travel of the workpiece.

By the utilization of vibration transmitting members or die members having substantial lengths in the direction of movement of the work material, it is possible to gradually change the cross section of the workpiece over a substantial distance. This is an essential advancement in the art since it is now possible to avoid a multiplicity of work stations, each of which changes the cross section a small finite amount. Each material processed, for example, if a metal, will have certain metallurgical properties making it undesirable to alter the cross-sectional thickness more than a given amount over a certain distance. But, by the employment of vibrators herein disclosed in accordance with the present invention, the material may be substantially reduced in cross section by the combined action of static force and vibratory working over a greater distance, since said vibrators may have working surfaces ranging from nominal line contact to several feet in the direction of movement of the workpiece.

The friction reduction effect in the passage of the workpiece through the die opening with a simultaneous reduced static force in addition to the material softening effect may be obtained over substantial distances by mounting the vibratory assemblies with their relatively longer working surfaces positioned parallel to the direction of travel of said workpiece.

Thus, in the arrangement of FIGS. 5 and 6, the apparatus 10c has its vibratory members 23c mounted in a non-rotatable manner within frames 28c and in a fixed spaced relationship to each other as by means previously disclosed with respect to FIGS. 1 and 2 to present their relatively longer working surfaces 15c in a plane substantially parallel to the direction of travel of the workpiece 55 as indicated by the arrow 59 (FIG. 6). The vibratory members 23c are comprised of a transmission member 26c and a die member 14c properly secured thereto.

The opposing contoured working surfaces 15c of said die members 14c considered as a unit have a circular cross section at the entrance end of the die opening 13c and thereafter continue to taper towards each other and simultaneously change in cross section to form a rectangular groove. The spacing between the opposing die surfaces 60 (FIG. 5) should be maintained at a minimum distance in order to prevent a flow of material 55 between the die surfaces with a resulting parting line to mar the exterior surface of said material.

The workpiece 55, which may have initially a circular cross section 56 of an enlarged diameter, prior to its entrance into the die opening 13c, is continuously fed therein by a feeding arrangement which may consists of a pair of pinch rollers 61 (FIG. 6) having contoured surfaces to engage the workpiece 55 and mounted and rotated in any conventional manner (not shown) to assure the continuous movement of said workpiece in the direction as indicated by arrow 59.

As will be noted in FIG. 6, the initial cross section formed by the contoured working surfaces 15c of the die members 14c at the entrance end of the die opening 13c is substantially equal to the initial cross section 56 of the workpiece 55 entering said die opening and then the die surfaces 15c progress in a taper substantially from said entrance to the exit end of said die opening to alter the cross section of the workpiece 55 to the shape as indicated at 58. It is realized that the change of cross-sectional shape of rod 55 from a circular configuration as it passes through the vibratory zone of motion to alter its cross section in the general area 57 thereof, until its final configuration at 58 which is rectangular is a matter of choice and will vary with the contoured configuration of the die surfaces 15c.

In similar fashion as explained with reference to FIG. 4, the vibratory members 23c are mounted in opposed spaced relationship to each other whereby the workpiece 55 passed therebetween and in contact with the respective working surfaces 15c of the die members 14c is subjected to a static force normal to its path of travel.

Generating means may be coupled to both of the vibratory members 23c for simultaneously vibrating the working surfaces 15c in a direction substantially normal to the path of travel of said workpiece, as indicated by the double-headed arrows 38c and the amplitude and frequency of vibrations being selected to provide peak acceleration of the vibrated die member 14c with at least 100 g so that the workpiece 55 passing between the die members 14c is formed to the desired cross section by the combined action of said static force and vibrations.

Referring now to FIGS. 7 and 8, it will be seen that the apparatus 10d for altering the cross sectional configuration of a workpiece 71 is generally similar to the previously described equipment 10c and differs substantially from the latter with respect to the fact that means are provided for rotating the die members and workpiece relative to each other about an axis which is generally parallel to the movement of the workpiece as it is fed therethrough.

Thus, it will be seen that, in the apparatus 10d, four vibratory assemblies 12d having contoured working surfaces 15d are mounted in fixed spaced relationship to each other to define a die opening 13d, and frames 28d are employed to support the mechanical vibratory members 23d in the similar manner as described with reference to FIGS. 1 and 2 and the latter mounted between a pair of parallel spaced annular end plates 63, as by means of studs 40d and nuts 41d. The end plates 63 are provided with a central opening 65 to permit the passage of the workpiece 71 therethruogh.

The annular end plates 63 are preferably formed with an outwardly directed rim 64 (FIG. 7) extending along its outer periphery to define an annular surface for mounting a ball bearing or other anti-friction bearing 66 having an inner race 67 pressed onto the annular surface of said rim 64 and having an outer race 68 in engagement with a stationary housing 69 thereby permitting all of the vibratory assemblies 12d as a unit to be rotated about a horizontal axis extending parallel to the movement of the longitudinal axis of the material 71 passing therethrough.

The transmission members 26d in addition to having contoured working surfaces 15d are provided with beveled edges 70 (FIG. 8) to permit said transmission members to be interfitted with respect to each other to provide a minimum spacing between the die surfaces and an almost complete enclosure of the workpiece 71. The workpiece 71 having an initial diameter 72 at least equal to the die opening 13d is caused to be subjected to the static force and high frequency vibrations transmitted thereto by the working surface 15d to effect a change in the diameter 72 of said workpiece 71 in the region 73 so that it finally exits from the die opening having the cross section of the diameter 74. The feeding means may consist of a pair of pinch rollers 75 mounted and rotated by means (not shown) to continuously feed said rod between and in contact with the working surfaces 15d in the direction as indicated by the arrow 77.

As the workpiece 71 passes through the die opening 13d the mounted vibratory assemblies 12d are rotated, as generally indicated by arrow 96 (FIG. 8), by providing a gear 80 mounted on at least one of the annular end plates 63 and a meshing gear 81 mounted for rotation on a shaft 82 and caused to rotate in any conventional manner (not shown) wherein the rotation of said gear 82, as indicated by the arrow 83 on FIG. 8, causes the rotation of gear 80 and the vibratory assemblies 12d relative to the workpiece 71. Any conventional means (not shown) may be employed to couple the coolant and power source to the transducers as they are rotated.

The vibratory assemblies 12d may be oscillated relative to the workpiece 71 as it passes through the die opening 13d. It is appreciated that only two vibratory assemblies might be utilized to obtain a smooth surface on a rod or wire shaped workpiece. The exact number of vibratory assembles required will be dependent on the cross-sectional configuration and the amount of vibratory energy required. As previously pointed out with the use of separable die or vibratory members, in accordance with the present invention, it is possible to control the amplitude of vibration of each die in addition to its frequency.

In oscillating the vibratory assemblies 12d of FIG. 8, the apparatus therein may be utilized to rotate each assembly a number of degrees sufficient to cover the spacing between the beveled edges 70.

FIGS. 9 and 10 show another embodiment of the invention 10e for forming rod like material 85 into complex single piece of cylindrical symmetry. This type of material working, wherein the die members are held stationary and the workpiece is inserted within the opening defined by said dies and simultaneously rotated, is generally referred to as swaging. This embodiment of the invention differs from the previously described equipment 10d in that the workpiece is rotated and the dies remain stationary. Additionally, the final configuration of the workpiece may have a complex surface of various diameters.

Thus, it will be seen that, in the apparatus 10e, two vibratory assemblies 12e having contoured working surfaces 15e to define a die opening 13e, which is substantially equal to the initial cross section of the workpiece 85, are mounted for supporting said working surfaces in fixed spaced relationship to each other to define said opening. Frames 28e are employed to support the mechanical vibratory members 23e in the similar manner as described with reference to FIGS. 1 and 2 and the latter are mounted between a pair of parallel spaced end plates 86, as by means of studs 40e and nuts 41e. The end plate 86 on the side of workpiece 85 is provided with a central opening 87 to permit the insertion of said workpiece into said die opening 13e.

The end plates 86 are formed with an outwardly directed flange 88 (FIG. 9) for mounting in any conventional manner on a housing 89 to thereby support the vibratory apparatus as a unit.

The vibratory transmission members 26e having contoured working die surfaces and acting as both vibratory transmission and die members are preferably mounted to have a minimal spacing between the opposing output surfaces 90 to provide a minimum clearance therebetween. The workpiece 85 is secured as by mounting it in a chuck or vise 91 that is caused to rotate in the direction as indicated by arrow 92 and simultaneously inserted into the die opening to alter the configuration of said workpiece 85 as in the stepped design and depth seen in FIG. 9, and then removed from within the die opening 13e as indicated by the double-headed arrow 93.

Simultaneously with the rotation of the workpiece, which is rotated about an axis which is generally parallel to the movement of the workpiece as it is progressively inserted into and removed from the die opening 13e, the die members 26e are caused to be vibrated at a frequency and amplitude to obtain the previously described material flow and friction reduction.

The central idea, which is common to all the embodiments of this invention, is the arrangement of one or more vibrating die members in such fashion as to permit the die vibration amplitude to be as large as the endurance limit of the vibration materials warrants and at the same time the working faces of the dies are at loops of motion of the vibrators. In this way absolutely large values of stroke are possible in all cases, so that large values of peak acceleration in the die member are available. It is this high value of peak acceleration which contributes chiefly to the friction reduction, static force reduction and material softening effects of the vibrations during a forming operation.

Due to these effects, it is possible for the first time to use a type of high frequency swaging operation to replace conventional drawing and continuous extrusion methods. Ordinary swaging, which is useful in forming complex single pieces of cylindrical symmetry, is not rapid enough in operation to compete with wire drawing speeds attained in drawing dies. But, the dramatic softening effects combined with friction reduction greatly increases the permissible rates of drawing through a rod being reduced in diameter by swaging. An additional difficulty in swaging is that it is a rotary operation, requiring that the dies not only reciprocate, but they must also rotate about a common axis. Now, although I have described a high frequency rotary swaging embodiment of this invention in this specification, I must also point out and describe an embodiment which eliminates the rotary feature. This is accomplished by positioning at least two sets of die members in tandem and wherein their die openings are in axial alignment with each other to receive the material being drawn.

In the arrangement of FIG. 11, a rod 94 whose cross-sectional area is to be reduced or altered is passed through a first and second set of vibratory assemblies 96 each comprised of a pair of vibratory members or die members 97 and mounted in fixed spaced relationship to each other in any conventional manner (not shown) to define a die opening 98 having a cross section less than that of said rod. The die members are vibrated in a plane substantially normal to the direction of movement of the rod therethrough and may be driven by a single transducer (not shown) through the connecting body 99 and designed in accordance with the teachings of U.S. Patent No. Re. 25,033, assigned to the present assignee.

The first set of dies in the direction of travel, as indicated by the arrow 100 reduces the diameter of the rod 94 by a pre-selected amount, but leaves a small flash line of the order of several thousandths of an inch at the open edges 101 of the first die pair 96. The reduced rod 102 then passes through a second die pair 96, having its die opening in axial alignment with the die opening of the first pair but which are rotated a sufficient amount so that the open edges 101 of the two vibratory assemblies 96 are not in line with each other. By this arrangement the second die pair irons out the flash line and smooths the rod in its reduced diameter. Finally, the reduced rod 102 passes through a polished guide member 103 which serves to burnish, polish or otherwise give a desired finish to the drawn rod.

It will of course be understood that more than two die sets each consisting of two or more die members are possible in this embodiment and that one is not limited to drawing round shapes. For very complicated cross sections as many die sets may be used as is necessary to achieve the complex shape in the most effective manner taking into account the plastic flow characteristics of the material being formed.

It will be recognized by those skilled in the art that the objects of the present invention have been achieved by providing die members maintained in opposed fixed spaced relationship to each other to define a die opening and wherein one or more of the die members are vibrated at a sufficient amplitude of vibration and frequency to substantially reduce the frictional resistance to the passage of the workpiece through the die opening and simultaneously reduced the static force of the die members against the workpiece. Since the die members or vibratory assemblies are fixed relative to each other, as distinguished from the rotatable rollers of existing rolling mill apparatus, substantial simplification results in the mounting of the vibrated die members and further, such die members can be provided with a working surface which has a substantial dimension in the direction of travel of the workpiece as well as transverse thereto to permit vibratory working of the workpiece over substantial areas. The ability to impart vibratory energy over substantial lengths in the direction of work travel, permits an increase in the speed at which the rods, sheets or webs to be worked on are fed through the vibratory apparatus. The amplitude of vibration of the working surfaces of the die members may be easily controlled and varied by the use of the transmission members to assure the necessary quantity of vibratory energy being imparted to the work object.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. Apparatus for reducing the cross-section of a plastically deformable workpiece comprising
    (A) at least two die members mounted in fixed opposed relationship to each other and having spaced working surfaces for contact with the workpiece, said working surfaces converging in the direction of movement of said workpiece.
    (B) feeding means for conveying the workpiece being processed between and in contact with the working surfaces which are spaced to exert a static force and reduce the cross section of said workpiece as it passes therethrough, and
    (C) a source of vibratory energy in the range of approximately 10,000 to 100,000 cycles per second coupled to at least one of said die members for vibration thereof, the vibrations having a component of motion in a plane substantially perpendicular to the path of travel of the workpiece, so that the workpiece is substantially softened as it passes between and in contact with said surfaces and the frictional resistance of its passage therethrough is substantially reduced.

2. Apparatus for reducing the cross-section of a plastically deformable workpiece comprising (A) at least two die members having working surfaces for contact with the workpiece, said working surfaces having a substantial dimension in the plane of travel of said workpiece, and converging in the direction of movement of said workpiece, (B) mounting means for supporting said dies in opposed spaced relationship to each other and wherein the spacing between said working surfaces is less than the initial cross section of the workpiece to be processed, (C) feeding means for continuously passing the workpiece between the opposing die members and in contact with their respective working surfaces and wherein a static force normal to the path of travel is transmitted to said workpiece, and (D) generating means coupled to at least one of said die members for simultaneously vibrating, in the range of approximately 10,000 to 100,000 cycles per second, the working surface thereof in a direction substantially normal to the path of travel of said workpiece, so that the workpiece passing between the die members is formed to the desired cross section by the combined action of said static force and vibrations.

3. Apparatus for reducing the cross section of a plastically deformable workpiece, comprising (A) at least two die members disposed with respect to each other in a substantially common plane and having opposing working surfaces, said working surfaces converging in the direction of movement of said workpiece, (B) feeding means for conveying the workpiece between and in contact with the opposing working die surfaces, (C) means for rotating said die members and workpiece relative to each other about an axis which is generally parallel to the movement of the workpiece as it is fed therebetween, and (D) means for simultaneously supplying high frequency vibrations, in the range of approximately 10,000 to 100,000 cycles per second, to at least one of said die members in a plane substantially normal to the direction of movement of the material, so that the workpiece between said die members has its cross-sectional area reduced by the combined action of said vibratory energy and static force.

4. Apparatus for altering the cross section of a plastically deformable workpiece comprising a first die having at least two members to form a first die opening with open edges, means to advance the workpiece, means to vibrate said first die members at a frequency of at least 400 cycles per second and having a component of motion along a first axis of vibration in a plane substantially perpendicular to the path of travel of the workpiece, a second die having at least two members to form a second die opening with open edges, the second die's open edges being out of alignment with the first die's open edges, means to vibrate said second die members in a manner similar to the first die members.

References Cited

UNITED STATES PATENTS

| | | | |
|---|---|---|---|
| 3,066,555 | 12/1962 | Burnel | 72—430 |
| 3,049,035 | 8/1962 | Hirst et al. | 72—453 |
| 3,212,312 | 10/1966 | Boyd et al. | 72—60 |
| 3,274,812 | 9/1966 | Evans | 72—60 |
| 3,182,475 | 5/1965 | Dilling | 72—77 |

CHARLES W. LANHAM, Primary Examiner

A. L. HAVIS, Assistant Examiner

U.S. Cl. X.R.

72—60, 285, 402